United States Patent [19]

Prochazka et al.

[11] 4,122,155
[45] Oct. 24, 1978

[54] PREPARATION OF SILICON NITRIDE POWDER

[75] Inventors: Svante Prochazka, Ballston Lake; Charles D. Greskovich, Schenectady, both of N.Y.

[73] Assignee: General Electric Company, Schenectady, N.Y.

[21] Appl. No.: 756,241

[22] Filed: Jan. 3, 1977

[51] Int. Cl.² .............................................. C01B 33/06
[52] U.S. Cl. .................................................... 423/344
[58] Field of Search ........................................ 423/344

[56] References Cited

U.S. PATENT DOCUMENTS

| B 581,564 | 3/1976 | Jacobsen | 106/47 |
|---|---|---|---|
| 3,352,637 | 11/1967 | Heymer et al. | 423/344 |
| 3,565,674 | 2/1971 | Boland et al. | 423/344 |

FOREIGN PATENT DOCUMENTS

| 1,136,315 | 9/1962 | Fed. Rep. of Germany | 423/344 |
|---|---|---|---|
| 1,432,559 | 9/1976 | United Kingdom | 423/344 |
| 942,082 | 11/1963 | United Kingdom | 423/344 |

OTHER PUBLICATIONS

"Vapor Deposited Silicon Nitride Films," J. Electrochem. Soc.: Solid State Science (Dec. 1969), pp. 1737–1740.

*Primary Examiner*—O. R. Vertiz
*Assistant Examiner*—Wayne A. Langel
*Attorney, Agent, or Firm*—Jane M. Binkowski; Joseph T. Cohen; Charles T. Watts

[57] ABSTRACT

A gas mixture of silane and ammonia is heated at temperatures between about 600° C and 1000° C producing an amorphous powdery reaction product which, when heated at a calcination temperature of at least 1100° C yields ultrafine $Si_3N_4$ powder of high purity.

6 Claims, No Drawings

PREPARATION OF SILICON NITRIDE POWDER

The invention herein described was made in the course of or under a contract or subcontract thereunder (or grant) with the Department of the Air Force.

This invention relates to preparation of very pure, ultrafine $Si_3N_4$ powder. The powder can be sintered under proper conditions to a high density ceramic.

A number of chemical reactions leading to $Si_3N_4$ have been described in the literature. Silicon nitride can be obtained most easily by nitridation of silicon powder at temperatures above 1200° C. However, the reaction does not go to completion unless either catalysts (such as iron and calcium compounds) or very high temperatures are used. Neither way gives pure and very fine $Si_3N_4$ because the catalysts cannot be removed after nitridation and the high temperature brings about crystal growth.

In another process $SiO_2$ is reduced with carbon in nitrogen below 1400° C. Still other processes react a silicon halide with ammonia or a nitrogen and hydrogen mixture to obtain either $Si_3N_4$ directly or via precursors such as $Si(NH)_2$ which are converted to $Si_3N_4$ by calcination. This second group of processes yield silicon nitride which usually contain oxygen and halogens at a 1 to 3% level.

Still further, synthesis in a plasma from silicon vapor and nitrogen, and reaction of some metal silicides with nitrogen has been described in literature but not evaluated in terms of the quality of the product.

Silane does not react with $NH_3$ at ambient temperatures but does react with liquid $NH_3$ when the reaction is catalyzed by an alkali amide. The product is a condensed substance with a variable composition containing the compounds $Si(NH_2)_2NH$ and $Si(NH)_2$. These compounds are very sensitive to moisture, and on contact with ambient air tend to hydrolyze rapidly. Also, the washing of the precipitate with liquid ammonia (to remove the alkali amide) makes this reaction inconvenient as a preparative technique.

In the present invention $SiH_4$ is reacted with $NH_3$ at elevated temperatures. Although the reaction of $SiH_4$ and $NH_3$ has been studied extensively in vapor deposition on heated substrates of $Si_3N_4$ thin films for electronics and formation of both amorphous and crystalline films has been described, there has been no disclosure of the present process for preparing pure ultrafine $Si_3N_4$ powder.

The overall stoichiometric reaction between silane and ammonia can be written:

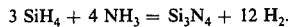

$$3\ SiH_4 + 4\ NH_3 = Si_3N_4 + 12\ H_2.$$

The probability for such a reaction to occur in one step would be negligibly small, and the actual reaction mechanism therefore involves intermediate compounds.

Briefly stated, the present invention comprises reacting a gas mixture of silane and anhydrous ammonia at a temperature ranging from about 600° C. to about 1000° C. producing an amorphous powdery reaction product which has a polymeric character, said ammonia being used in an amount of at least about 15 times in excess of stoichiometric amount. By a polymeric character it is meant that the reaction product, in addition to containing complex large molecules, is a non-crystalline insoluble material. The density of the reaction product powder particles increases with increasing reaction temperature and ranges from about 2.4g/cc at a reaction temperature of about 600° C. to about 2.7g/cc with a reaction temperature of about 1000° C.

In one embodiment of the present process, the amorphous powdery reaction product is calcined at a temperature ranging from about 1100° C. to about 1480° C. for a sufficient period of time to convert substantially all of the reaction product to amorphous, at least substantially stoichiometric, or stoichiometric, $Si_3N_4$ powder having a surface area generally ranging from about $5m^2/g$ to about $20m^2/g$. By the term amorphous, at least substantially stoichiometric $Si_3N_4$ it is meant a noncrystalline powder with a composition corresponding to stoichiometric $Si_3N_4$ which may contain a minor amount, usually less than 1% by weight of the powder, of excess silicon. In this embodiment, the calcination is carried out in an atmosphere which has no significant deleterious effect on the conversion of the reaction product to the amorphous $Si_3N_4$ powder, and representative of such a calcining atmosphere is argon, helium, nitrogen, hydrogen, and mixtures thereof.

The extent of conversion of the present reaction product to amorphous $Si_3N_4$ powder depends largely on the particular calcining temperature and the period of time the reaction product is held in calcining temperature. The lower the calcining temperature the longer is the calcining time necessary to complete the conversion to the amorphous $Si_3N_4$ powder. Completion of the reaction product to amorphous $Si_3N_4$ may be determined by determining weight loss of the product being calcined, and when the calcined product reaches constant weight, this indicates completion of such conversion. Generally, to produce at least a substantial conversion of the reaction product to amorphous $Si_3N_4$ powder, a calcining temperature of about 1100° C. would require about 2 hours whereas a calcining temperature of about 1480° C. would require a few minutes. Also, with increasing calcining temperatures the density of the power particles increases, and usually a calcining temperature of about 1450° C. produces an amorphous $Si_3N_4$ powder close to the theoretical density, of crystalline $Si_3N_4$, i.e. 3.18g/cc.

In another embodiment of the present process, the amorphous powder reaction product, or the amorphous $Si_3N_4$ powder, or a mixture thereof, is calcined in an atmosphere of nitrogen at a temperature ranging from about 1400° C. to about 1600° C. to product stoichiometric $\alpha$-$Si_3N_4$ having a surface area generally ranging from about $5m^2/g$ to about $15m^2/g$. Usually, calcining temperatures of 1400° C. to about 1500° C. produce crystalline $Si_3N_4$ powders with a surface area from about $10m^2/g$ to about $15m^2/g$. However, at calcining temperatures above 1500° C., the powder coarsens and the resulting crystalline powder usually has a surface area less than $10m^2/g$. Likewise, the extent of conversion to crystalline $\alpha$-$Si_3N_4$ depends largely on the particular calcining temperature and calcining time. For example, calcining the reaction product, or amorphous $Si_3N_4$ powder, or a mixture thereof to produce at least a substantial conversion thereof to crystalline $\alpha$-$Si_3N_4$ at a temperature of about 1400° C. would require a calcining time of at least about an hour or longer, whereas at about 1600° C. the calcining time would be a few minutes. Completion of the conversion to crystalline $Si_3N_4$ is determinable by X-ray diffraction analysis of the calcined product.

In the present invention to insure that the reaction product as well as the $Si_3N_4$ powder resulting therefrom is free of metallic impurities, the reaction and calcination should be carried out in a non-metallic reaction chamber or container. Representative of non-metallic materials which may be used are fused quartz, glass, porcelain and mullite.

The present process can be carried out as a batch process or as a continuous process.

In carrying out the present process, the reaction chamber should be initially purged or flushed with a substantially inert gas such as argon to remove any impurities which may be present and then heated to the desired reaction temperature before the silane and ammonia gases are metered in.

In the present process, the silane is of high purity, i.e. at least about 99.9% pure or higher. Such a pure silane is known in the art as electronic grade. Anhydrous ammonia is used, i.e. ammonia which is free of water vapor or contains no significant amount of water vapor. For best results, commercial anhydrous ammonia should be dried, for example by passing it through a drying agent such as calcium nitride, before it is reacted with the silane. The ammonia is used in an amount of at least 15 times in excess of stoichiometric amount. However, to insure that a sufficient amount of ammonia is present, the amount of ammonia may range up to about 25 times in excess of the stoichiometric amount. Amounts of ammonia less than 15 times in excess of stoichiometric amount will produce a product containing elemental silicon in a significant amount. On the other hand, amounts of ammonia higher than about 25 times in excess of the stoichiometric amount provide no advantages.

The silane and ammonia gases are introduced into the rection chamber at a rate which gives the present ratio. The reaction temperature ranges from about 600° C. to about 1000° C. At a temperature below 600° C. the reaction does not go to completion and poor yields are obtained. Reaction temperatures higher than 1000° C. are not useful because they decompose ammonia. Reaction temperatures ranging from 650° C. to 850° C. are preferred since they produce the largest amount of reaction product. The reaction product is powdery, amorphous and usually light tan in color. It is produced in a yield of at least about 90% and usually about 100% of the theoretical yield based on silane.

The amorphous or crystalline $Si_3N_4$ powder produced in the present process are free of metallic or non-metallic impurities except oxygen. These powders may contain oxygen which may be present up to about 3% by weight of the powder. The amorphous or crystalline $Si_3N_4$ powders are free-flowing and white or light tan in color. They are stable in air. The power particles, themselves, are globular in shape.

The present $Si_3N_4$ powder, in crystalline or amorphous form, or mixtures thereof, is useful for forming ceramic bodies useful for high temperature structural applications such as gas turbine blades by hot-pressing or sintering processes.

The invention is further illustrated by the following examples wherein the procedure was as follows unless otherwise stated:

The reaction products and calcined products were characterized by X-ray diffraction, surface area measurements, electron diffraction and microscopy and IR absorption spectroscopy.

EXAMPLE 1

The reaction is each run tabulated in Table I was carried out in a system which included an open-ended fused silica reaction tube 3.8 cm. diameter placed in a tube furnace, i.e. except for its open-end portions the reaction tube was located inside the furnace, and connected on the downstream end to a coaxial electrostatic separator operated between 5 and 15 KV and 0.2 to 0.5 mA. The outlet of the separator was determined with a bubbler filled with an organic solvent which ensured positive pressure in the system. A liquid manometer indicated gas pressure in the reaction tube. For each run the reaction tube was heated at a length of 15 inches to the reaction temperature indicated in Table I, the reaction tube purged with purified argon and the reactants were then metered into the reaction tube. Electronic grade silane and anhydrous ammonia, which had been dried further by passing it through a column of calcium nitride, were metered in separately by coaxial inlets into the reaction tube. The gas flow rates for each run are indicated in Table I. A voluminous powder was collected in the downstream end of the reaction tube and in the attached electrostatic separator. After about 4 hours the gas flow of reactants was discontinued and the system was left to cool off to room temperature under a flow of 0.5 SCFPH of purified argon.

After termination of a run the system was disassembled and the reaction product was washed out of the tube and the separator by benzene. The powdery reaction product deposited predominantly downstream from the hot zone (60-70%) and a smaller amount was collected in the separator. In every run both portions of the product were recovered together.

In general the reaction product was a non-coherent powder and could be easily scraped out or washed out of the reaction tube. The recovered reaction products were either dried and stored in a nitrogen glove box or calcined in a flowing gas mixture of 1 part nitrogen/3 parts hydrogen directly after recovery from the reactor. Specifically, each of the reaction products in Runs 11-17 in Table I was calcined at the indicated calcination temperature for a period of about 30 minutes.

TABLE I

| Run No. | Reaction Temp. °C | Gas Flow Rates cm³/sec NH₃ | SiH₄ | Reaction Product Color | Calcining Temp. °C | Surface Area m²g⁻¹ |
|---|---|---|---|---|---|---|
| 1 | 820 | 12 | 3.2 | light brown | — | 26 |
| 2 | 780 | 12 | 3.2 | brown | — | 14 |
| 3 | 720 | 12 | 2 | brown | — | 15.5 |
| 4 | 920 | 12 | 1.2 | light orange-brown | — | 11.8 |
| 5 | 530 | 8 | 0.56 | white | — | 80 |
| 6 | 590 | 16 | 1.15 | light tan | — | 12.5 |
| 7 | 550 | 16 | 1.15 | yellow | — | 24.0 |
| 8-10 | 600 | 16 | 1.15 | light tan | — | 15 |
| 11-13 | 650 | 16 | 1.15 | light tan | 850° C | 7.9 |
| 14-15 | 750 | 16 | 1.15 | white | 1150° C | 10.5 |
| 16 | 850 | 16 | 1.15 | light tan | 1150° C | — |
| 17 | 850 | 30 | 1.15 | light tan | 1150° C | 14.4 |

The two main parameters which control the present reaction between $SiH_4$ and $NH_3$ are temperature and ammonia-to-silane ratio. Below 500° C. no appreciable reaction was observed and the gases ignited at the exit of the system due to the presence of unreacted and nonpyrolized $SiH_4$. The only indication of a slight reaction was a light yellow, irridescent film which formed on the reaction tube wall.

As illustrated by Runs 1–4 of Table I, with ammonia-to-silane ratios less than 10, brown to orange reaction products were obtained at temperatures between 700°–920° C. The discoloration was presumably due to the presence of free silicon. This was supported by subsequent annealing of specimens of Runs 1 and 2 in nitrogen at temperatures above 1400° C. when these powders turned cream-white and gained weight, 5% and 8% respectively.

As illustrated by Runs 5–17 by increasing the ratio of ammonia/silane to greater than 10, white or light tan powders were obained. The lowest temperature at which an appreciable yield was obtained was 530° C., Run No. 5. The yield increased with increasing temperature and was close to the theoretical value at and above 650° C. Further increase in the $NH_3/SiH_4$ ratio, beyond about 15, and in the reaction temperature, above 650° C., did not appear to have any marked effect on the appearance and yield off the product. Only a slight variation of color, white-to-cream, was noticed between separate runs of No. 8 through 17.

All the reaction products of Table I were amorphous to X-rays, including the calcined products.

Run Nos. 8–17 in Table I illustrate the present invention where $NH_3$ was used in an amount about 15 times in excess of the stoichiometric amount. Runs 8–10, were identical runs as well as Runs 11–13 and 14–15.

In Runs 8–17 the yield of reaction product was about 100% of the theoretical yield based on silane as evidenced by the fact that there was no detectable silane in the exit of the reactor. In Runs 11–17, each reaction product was calcined at the indicated calcining temperature in an atmosphere comprised of three parts hydrogen/one part nitrogen. In Runs 11–13 the calcining temperature of 850° C. was too low to convert a substantial amount of reaction product to amorphous $Si_3N_4$. In Runs 14–17, the calcining temperature of 1150° C. produced the desired conversion of substantially all of the reaction product to amorphous stoichiometric $Si_3N_4$ powder.

The reaction product of Run No. 10 contained about 3% by weight oxygen.

The calcined reaction product of Run No. 17 contained 2.08% by weight oxygen. Also, examination of the calcined product of Run 17 by emission spectroscopy showed that it contained less than 50 ppm of metallic impurities, which is considered to be equivalent to a powder free of metallic impurities.

EXAMPLE 2

The amorphous $Si_3N_4$ powder produced in Run No. 17 of Example 1 was calcined at a temperature of 1480° C. in a nitrogen gas atmosphere for 30 minutes. Substantially all of the amorphous $Si_3N_4$ powder was converted to crystalline $\alpha$-$Si_3N_4$ powder as shown by X-ray diffraction analysis.

EXAMPLE 3

Amorphous silicon nitride powder was prepared substantially as set forth in Run No. 17. This powder was admixed with 1% by weight $Be_3N_2$ and 2% by weight $Mg_3N_2$ in a 1% solution of paraffin in benzene. All of the formulation was done under nitrogen dry-box conditions. The mixture was milled with ¼ inch silicon nitride grinding media at room temperature. After about 6 hours, the resulting slurry was strained and dried from the solvent again under dry-box conditions. The resulting homogeneous submicron powder mixture was die-pressed into a green body, i.e. ⅜ inch × ⅜ inch cylinder having a green density of 51%.

The green body was sintered at a temperature of 1880° C. for 20 minutes under a superatmospheric pressure of nitrogen at 85 atmospheres. The resulting sintered body had a density of 2.9g/cc which corresponds to 93% of the theoretical density of silicon nitride. The body had undergone a shrinkage of 19.25% during sintering.

What is claimed is:

1. A process for producing an amorphous silicon nitride powder free of metallic and non-metallic impurities except for oxygen, which consists essentially of reacting a gaseous mixture of silane and anhydrous ammonia at a reaction temperature ranging from about 600° C. to about 1000° C. producing an amorphous powdery reaction product in an amount of at least about 90% of theoretical yield based on silane, said anhydrous ammonia being used in an amount ranging from about 15 times to about 25 times in excess of the stoichiometric amount, calcining said amorphous powdery reaction product at a temperature ranging from about 1100° C. to 1480° C. for a period of time sufficient to convert at least a substantial amount thereof to amorphous, stoichiometric $Si_3N_4$ powder ranging in surface area from about $5m^2/g$ to about $20m^2/g$, said calcining being carried out in an atmosphere selected from the group consisting of argon, helium, nitrogen, hydrogen and mixtures thereof.

2. A process according to claim 1 wherein said amorphous $Si_3N_4$ powder is calcined in an atmosphere of nitrogen at a temperature ranging from about 1400° C. to about 1600° C. for a period of time sufficient to convert at least a substantial amount thereof to crystalline $\alpha$-$Si_3N_4$ powder ranging in surface area from about $5m^2/g$ to about $15m^2/g$.

3. A process according to claim 1 wherein said reaction temperature ranges from about 650° C. to 850° C.

4. A process according to claim 1 wherein said reaction is carried out in a non-metallic chamber.

5. A process according to claim 1 wherein said amorphous stoichiometric $Si_3N_4$ powder contains excess silicon in an amount of less than 1% by weight of the powder.

6. A process for producing crystalline $\alpha$-$Si_3N_4$ powder free of metallic and non-metallic impurities except for oxygen, which consists essentially of reacting a gaseous mixture of silane and anhydrous ammonia at a reaction temperature ranging from about 600° C. to about 1000° C. producing an amorphous powdery reaction product in an amount of at least 90% of theoretical yield based on silane, said anhydrous ammonia being used in an amount ranging from about 15 times to about 25 times in excess of the stoichiometric amount, calcining said amorphous powdery reaction product at a temperature ranging from about 1400° C. to 1600° C. for a period of time sufficient to convert at least a substantial amount thereof to crystalline $\alpha$-$Si_3N_4$ powder ranging in surface area from about $5m^2/g$ to about $15m^2/g$, said calcining being carried out in an atmosphere of nitrogen.

* * * * *